March 18, 1969

R. G. RIEDESEL 3,433,703

METHOD OF FORMING PAPER FROM SYNTHETIC FIBERS
HAVING A SKELETAL STRUCTURE

Original Filed Feb. 3, 1964

INVENTOR.
RICHARD G. RIEDESEL
BY Kinney, Alexander,
Sell, Steldt & DeLaHunt
ATTORNEYS United States Patent Office 3,433,703
Patented Mar. 18, 1969

3,433,703
METHOD OF FORMING PAPER FROM SYNTHETIC FIBERS HAVING A SKELETAL STRUCTURE
Richard G. Riedesel, Stillwater Township, Washington County, Minn., assignor to Minnesota Mining and Manufacturing Company, St. Paul, Minn., a corporation of Delaware
Original application Feb. 3, 1964, Ser. No. 341,913. Divided and this application Nov. 21, 1967, Ser. No. 701,796
U.S. Cl. 162—157                 3 Claims
Int. Cl. D21h 5/12

ABSTRACT OF THE DISCLOSURE

Preparation of vapor permeable flexible synthetic leather construction by cutting monofilaments which contain ultra fine filaments therewithin, forming a dispersion of cut fibers into a mat on a paper machine, drying the mat and subjecting same to heat to form continuous skeletal structures from resin present in the monofilament.

---

This invention relates to new and very useful mat-like structures and to methods for making the same. This is a division of application Ser. No. 341,913 filed Feb. 3, 1964.

More particularly this invention is directed to nonwoven, moisture vapor permeable, flexible, mat-like structures which have bulk density lens than the absolute density of the component materials and which are useful for a wide variety of fabric and coating operations and which can have physical properties closely resembling those traditionally associated with leather. The invention also relates to methods for manufacturing such mat-like structures.

The mat-like structures comprise a uniform mixture of at least two different types of man-made organic polymeric materials. One of these materials is in the physical form of ultra fine filaments. Each such discrete ultra fine filament has a maximum cross-sectional dimension smaller than about 5 microns. At least 50 weight percent of such ultra fine filaments have cross-sectional dimensions not smaller than about 3 microns and minimum respective lengths greater than about 600 microns each. Preferably at least 50 weight percent of such ultra fine filaments have respective lengths at least 200 times the maximum cross-sectional dimension of each ultra fine filament.

The second such polymeric material is in the physical form of a continuous skeletal structure. Preferably this skeletal structure is composel of discrete particles which are bonded to one another (i.e., interbonded) at their respective points of contact with one another. Each such discrete particle has at least two dimensions less than about 5 microns and a third dimension greater than about 5 microns (all such dimensions being taken perpendicularly to one another). These particles are substantially solid in physical structure and so are not fibrilated and not dendritic in the sense of fibrid particles. Preferably the skeletal structure in one class of mat-like structures of this invention comprises less than 50 weight percent of the total structure and still more preferably between 30 and 50 weight percent.

In a given mat-like structure of this invention, the relationship between the quantity of said ultra fine filaments and the quantity of said particles is such that when, within said structure, substantially all of said particles are bonded to one another at their respective points of contact, resulting in a substantially continuous skeletal structure composed of said second material. Also within said structure substantially none of said ultra fine filaments are fused to one another.

The invention is better understood by referring to the attached drawing wherein.

Figure 1:
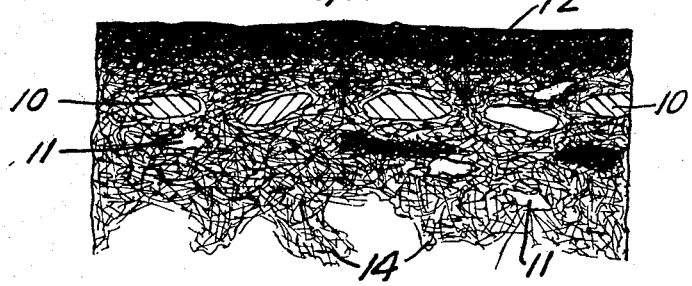
FIGURE 1 is an artist's diagrammatic drawing of a photomicrograph of a vertical-sectional view through a product of this invention.

To make the mat-like structures of this invention, one begins with monofilaments composed of at least two different types of man-made organic polymeric materials, such as incompatible thermoplastic resins. Such monofilaments can be made by any conventional means, for example, as taught by U.S. Patent No. 3,099,067.

By the teachings of this patent one can prepare monofilaments composed of at least two incompatible thermoplastic resins. Each such monofilament is characterized by having one of said resins present therewithin in the form of ultra fine filaments. Each such ultra fine filament has a generally circular cross-section and is positioned within its associated monofilament so as to extend generally longitudinally therewithin. One other of such resins is present within such monofilament in the form of a continuous matrix about said ultra fine filaments. While the teaching of this patent relates generally to the use of two incompatible thermoplastic resins, it will be appreciated that by the teachings of this invention one can produce monofilaments suitable for use in the products of this invention which contain more than two incompatible thermoplastic resins per monofilament.

In employing such monofilaments to produce the mat-like structures of this invention, one first cuts such monofilaments into lengths not greater than about one-half inch. It will be appreciated that lengths considerably shorter than this are fully within the teachings of this invention. The exact length being employed in any given emboliment being dependent upon the particular type of product one desires to manufacture.

Next one disperses the resulting cut monofilaments in a liquid medium. The composition of this medium is so chosen as to make the medium at least a partial solvent for one of the resins composing the monofilaments, preferably that resin which comprises the continuous matrix portion. Owing to ease of manufacturing, one preferred method of practicing this invention is to employ monofilaments wherein the continuous matrix is so selected as to be separable from the ultra fine filaments by means of water as the liquid medium.

Next one agitates the resulting dispersion or slurry until there results a substantial separation of each resin from the others comprising the monofilaments being used. By the term "substantially separation" reference is had to the fact that the continuous matrix portion of the monofilament tends to separate from the ultra fine filaments to such an extent that usually at least about 50% of the original cut monofilaments are broken into ultra fine filaments and particles derived from the continuous matrix. Preferably separation is substantially complete. It will be appreciated that as a result of the separation there is produced at least two classes of materials, depending upon the nature of the composition of the starting monofilaments. One class of materials consists of the ultra fine filaments which were originally within the monofilaments. Another class of materials consists of discrete particles derived from the former continuous matrix which was about the ultra fine filaments. If more than two incompatible components are present in the starting monofilaments there may be more than one class of either ultra fine filaments or discrete particles present in a given dispersion. Also, if one of the components of the starting monofilament is soluble in the liquid medium, the product sheet may contain minor, residual amounts of soluble component.

Next the resulting dispersion is formed into a mat by conventional paper-making techniques well known to those of ordinary skill in the art. Thus one can deposit the resulting dispersion upon a paper-making screen so as to produce a mat. Preferably this mat has a thickness not less than about 1/16 inch (weight basis). Then the mat can be couched to remove excess liquid. Lastly, the resulting mat can be dried to remove residual liquid.

Now the resulting mat-like structure is processed so as to interbond at least one class of the discrete particles present to one another and, possibly, also to other classes of discrete particles which may be present, so as to produce a continuous skeletal structure composed of interbonded discrete particles.

The bonding of the particles to one another, or the interbonding, can be accomplished by heat fusion, partial solvation, or any similar technique which fuses at least to an extent sufficient to effect bonding the particles to one another at their respective points of contact with one another. For example, because of ease in processing, one preferred method of accomplishing bonding is to use monofilaments wherein the continuous matrix can be heat softened and possibly even melted at a temperature sufficiently below the equivalent point for the ultra fine filaments that particles of the continuous matrix material are bondable to one another in a zone of heat which is insufficient to appreciably alter the physical characteristics of the ultra fine filaments. Thus, it is preferred to use such a combination of incompatible thermoplastic materials in the monofilament that the mat-like non-woven structure produced by paper-making techniques can be subjected to a zone of heat sufficient to bond together one type of resinous particles to other particles of the same type so as to produce the desired continuous skeletal structure composed of such particles, the zone of heat used being insufficient to appreciably alter the physical characteristics of the resin composing the ultra fine filaments. The ultra fine filaments in structures of this invention should be substantially not fused one to another.

By the term "non-woven" as used herein reference is had to the fact that mat-like structures of this invention consists mainly of materials which are non-woven and not made such as by knitting, weaving or the like. It will be appreciated, however, that it may be desirable and indeed preferred for certain applications of the mat-like structure of this invention to employ within the mat-like structures of this invention, woven or knit structures which serve to reinforce or otherwise improve properties desired in final products. However, when such woven materials are used in making mat-like structures of this invention they generally will comprise not more than about 20 weight percent of the total mat-like structure, and indeed, in most cases they will comprise not more than about 5 weight percent of a total mat-like structure.

One especially useful type of monofilament for purposes of making the mat-like structures of this invention comprises a three component combination of incompatible thermoplastic resins, to wit, a polyamide, such as "Nylon-6," ethylene-vinyl acetate copolymer (such as "Elvax 250," a product of the Du Pont Corporation) and a non-volatile high molecular weight water soluble polyethylene glycol (such as "Carbowax M-20," a product of Union Carbide). In monofilaments made from this combination of incompatible resins, the polyamide becomes the ultra fine fibers while the ethylene-vinyl acetate copolymer and the polyethylene glycol polymer become the continuous matrix. Usually in such a monofilament the polyamide comprises from about 40-60 weight percent, the ethylene-vinyl acetate copolymer from about 20-40 percent and the balance up to 100% in any given composition being the polyethylene glycol polymer. Preferably such a three component monofilament should contain not less than about 5 weight percent of the ethylene glycol polymer within the limits above described. It is a peculiar feature of such a monofilament structure that when cut up as indicated above in making the mat-like structures of this invention that it relatively quickly breaks apart into the respective insoluble resinous components, to wit, the polyamide and the ethylene vinyl acetate copolymer in an aqueous media. Presumably the ethylene glycol polymer goes into solution in such media. Thus, it is relatively easy to make slurries useful for manufacturing the mat-like structures of this invention by paper-making techniques without the use of costly organic liquids and the problems associated therewith.

Figure 2:
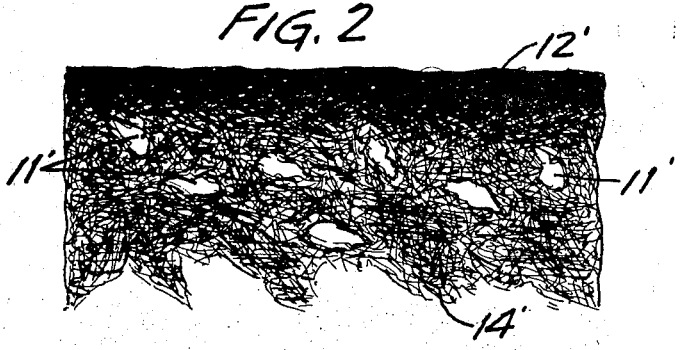
FIGURE 2 is an artist's diagrammatic drawing of a photomicrograph of a vertical-sectional view through another product of this invention.

Referring to the drawings it will be appreciated that in FIGURES 1 and 2 are shown two respective samples of mat-like structures produced in accordance with the methods taught herein. It is seen that these structures are remarkably similar to a similarly sized and magnified piece of natural leather. It will be appreciated that in these FIGURES 2 and 3, numerals with prime marks added thereto refer to similar parts and portions bearing the corresponding numbers in FIGURE 1.

Referring to FIGURE 1 it is seen that the mat-like structure there shown has a closely packed, relatively smooth face 12, and a rather loosely packed rough back face 14. Within the interior are pores 11 which appear during the manufacturing process. The embodiment shown in FIGURE 1 has embedded within it a netted reinforcing web, portions 10 of which can be seen in FIGURE 1.

Figure 3:
FIGURE 3 is an artist's diagrammatic drawing of a photomicrograph of a vertical-sectional view through a sheet of naturally occurring conventionally tanned leather.

In FIGURES 1, 2 and 3 it is seen that the structures are essentially composed of short fibers, the dimensions of the fibers in each case being very small.

The invention is further illustrated by reference to the following examples:

In these examples the equipment for making the monofilaments employs a 3/4", 16 to 1 length to diameter ratio barrel and screw extruder having attached to the barrel end thereof an adapter and gear pump followed by a spin pack and spinneret. The spinneret used has 37 holes, each hole having a diameter of 0.018". The rate of extrusion is about 20 grams per minute. The takeup roll is run at 250 ft./min., and the draw rolls at 400 ft./min. The monofilaments produced are wound up on a core using a Leesona winder. A number of these cores of monofilament yarns are mounted on a creel and the individual yarns are gathered into a tow which is then cut into 1/4" lengths using a conventional cutter.

In each of the succeeding examples the following furnish is used: The blend of polymers used comprises 50% by weight of a polycaprolactam (e.g. "Plaskon 8201," a product of Allied Chemical and Dye Corp., or the medium viscosity polycaprolactam obtainable from American Enka Corp.), 40% by weight of a copolymer of ethylene and vinyl acetate (e.g. "Elvax 250," a product of Union Carbide), and 10% by weight of a high molecular weight polyethylene glycol polymer (e.g. "Carbowax M-20," a product of Union Carbide). Initially the three materials are dry blended by tumbling prior to being fed into the extruder hopper. The temperatures used in the extruder and spinning assembly are controlled to provide a spinnable extrudate. There is approximately a 10 ft. drop from the spinneret to the takeup Godet and an air quench is used below the spinneret. The yarn obtained is approximately 1470 total denier containing 37 filaments with a denier per filament of about 40. A one pound Valley paper beating machine is charged with 400 grams of this fiber which have been previously cut into 1/4" lengths, plus approximately 5 gallons of water. The fiber is circulated through the machine to wet it out without the use of a bed knife. After 100 minutes the bed knife is applied and the beater is run for another 140 minutes. The following examples are made using this furnish.

EXAMPLE 1

Two hand sheets (7" x 7") each weighing 12 grams are prepared by placing 1000 cc. of furnish containing 1.2% w. resin solids into a Williams hand sheet mold which contains approximately 3500 cc. of water. The drain on the mold is then opened and the solid materials deposited on a 120-mesh screen. The sheet is removed and dried in a Williams hand sheet drier operating at about 212° F. Two sheets are each dip-saturated with a polyurethane latex emulsion (e.g. Wyandotte latex E–207), 80 parts of which are diluted with 300 parts of water. Approximately 0.7 gram (dry weight basis) of polyurethane latex solids are retained in each sheet.

The saturated sheets are first blotted dry and then are further dried in an air-circulating oven at a temperature of about approximately 212° F. After drying, the sheets are placed together with one of the screen sides contacting the non-screen side of the other sheet. A smooth-surfaced silicone-coated paper is applied to the exposed screen side face (hereinafter called the face side) of this composite, and a #50 grit Garnet paper is applied to the other face (hereinafter called the back side). The composite is then placed in a heated platen press (about 350° F.) for about 30 seconds under a pressure of about 5 p.s.i. The resulting composite is then withdrawn from the press, cooled, and the silicone-coated paper and the #50 grit Garnet paper removed. Finally, the resulting laminate is subjected to hand flexing. The back side is lightly scuffed with #50 grit Garnet paper.

EXAMPLE 2

This example is prepared in the same manner as Example 1, with the exception that a urethane-saturated knit fabric is interposed between the two laminae. The fabric is knit using a monofilament extruded in air from a single hole spinneret having an opening diameter of about 0.060". The composition of the polymers used is the same, substantially, as that used in making the monofilaments employed in Example 1.

The monofilament, after coming out of the spinneret, is cooled by passing through a cold water bath. The residence time in the bath is substantially less than one-half second. It then passes over a first Godet roll, then to a second Godet or draw roll driven at a speed approximately three times faster than the first Godet roll. The monofilament resulting from the operation is thereby oriented and has a final diameter of approximately 0.0007".

The knit fabric is then washed with hot water for several minutes after which it is dried on a tentering frame. The fabric is then dip-saturated with the polyurethane latex emulsion used in Example 1, after which it is blotted dry and then further dried in an air-circulating oven at 212° F. The fabric thus produced has a mesh or loop size of approximately 1/16".

EXAMPLE 3

This example is similar to Example 2, however, the hand sheets are saturated with the polyurethane latex emulsion used in Example 1, however, which is first diluted at a ratio of 80 parts emulsion and 600 parts of water. One of the hand sheets and the knit fabric prepared as in Example 2, are saturated with the polyurethane saturant after which they are separately dried as in Example 1. A laminate comprising the saturated hand sheet, the saturated knit fabric, and an untreated hand sheet are placed in a heated platen press (about 350° F.) for about 30 seconds, and under a pressure of about 5 p.s.i. The face and back sides are provided with contacting sheets as in Example 1. The laminate is removed from the press, cooled, hand flexed and scuffed lightly on the back side.

EXAMPLE 4

This example is made exactly as Example 3, but the saturating solution is made using a mixture of 80 parts of the polyurethane latex emulsion of Example 1 and 1200 parts of water.

EXAMPLE 5

The monofilaments used in this example are prepared, as for Example 1, from a dry blend of 50 parts of polyamide polymer ("Nylon-6" as sold by Spencer Chemical Company), 30 parts of ethylene-vinyl acetate copolymer ("Elvax–250" as sold by the Du Pont Corporation), and 20 parts of high molecular weight polyethylene glycol ("Carbowax M–20"). The monofilaments are cut into lengths of 3/16" and 10 grams thereof, together with 500 grams of water, are beaten in a Waring Blendor for two minutes. Water and excess wax solution are removed by squeezing in a cheesecloth bag after which the dispersed material is beaten together for another two minutes with an additional 500 grams of water. A sheet is formed from this furnish by deposition on a 40-mesh screen and roll squeezing out the surplus water. A cheesecloth cover is used during rolling. The sheet is further dried for one-half hour in an air-circulating oven maintained at 150° F. After drying, the sheet is heat-bonded in a platen press (about 320° F.) for about 30 seconds at about 5 p.s.i. The finished sheet weighs about approximately 0.3 gram per square inch and has a moisture vapor transmission rate of 1100 grams per square meter per 24 hours (using 100% relative humidity on one face and 50% relative humidity on the other face).

EXAMPLE 6

A non-woven mat-like structure is made using two different types of monofilaments. One monofilament designated (a) comprises a polyamide polymer, an ethylene-vinyl acetate copolymer, and a high molecular weight polyethylene glycol (all polymers as in Example 1). The other monofilament designated (b) comprises a polyurethane polymer (e.g. "Texin-192," a product of Mobay Chemical Co.), an ethylene-vinyl acetate copolymer, and a high molecular weight polyethylene glycol, the latter two polymers being the same as used in Example 1. The first monofilament has a dry blend ratio of polymers of 55:40:5, the second, a ratio of 40:55:5. The monofilaments are made using substantially the same process as is used to prepare the monofilaments for the knit fabric of Example 2. Both types of monofilaments are cut into 1/8" lengths. 18 grams of monofilament (a) and 15 grams of monofilament (b), together with 170 milliliters of water, are beaten for two minutes in a Waring Blendor. Then, 170 grams of toluene are added and beating is continued for another three minutes. Approximately 140 grams of liquid is removed from the slurry by hand squeezing in a cheesecloth bag, after which the partially dried solid ingredients are reintroduced with 600 grams of water into the blendor and beaten for an additional three minutes. The slurry is then removed from the blendor and cast onto a 40-mesh stainless steel screen. After the surplus liquid is roll-pressed out, the sheet is dried for about one-half hour in an air-circulating oven operating at 150° F. The sheet is then placed in a heated platen press (about 375° F.), held for about 30 seconds under about 5 p.s.i. As in Example 1, the face side of the sheet is provided with a silicone-coated paper and the back side with a #50 grit Garnet paper. After removing the sheet from the press it is cooled and the back side roughened slightly by sanding.

EXAMPLE 7

This structure is made using the same fibers as in Example 6. A 50:50 mixture is prepared of monofilaments which have been cut into about 1/8" lengths. These monofilaments are then dissolved in sufficient toluene to provide a solution containing 10% solids, based on the total amount of ethylene-vinyl acetate copolymer present. Dissolving and dispersing of the monofilament solvent blend is aided by shaking for 15 minutes on a paint shaker. The slurry thus obtained is then coated onto a silicone-coated paper and levelling out of the coating is aided by a vibrating spreader bar. The coated sheet is then dried in an air-circulating oven operating at 150° F. After drying, the dried sheet is placed in a heated platen press (about 310° F.) for about 45 seconds at about 5 p.s.i. As in Example 1, the face side of the sheet is provided with a silicone-coated paper and the back side with a #50 grit Garnet paper. After removing the sheet from the press it is cooled and then roughened slightly on the back side by sanding. The sample is first soaked and then hand-worked and washed in hot water to remove most of the high molecular weight polyethylene glycol material.

What is claimed is as follows:

1. In a process for making a non-woven, moisture vapor permeable, flexible, mat-like structure from monofilaments composed of at least two incompatible thermoplastic resins, each such monofilament being characterized by having one of said resins present therewithin in the form of ultra fine filaments, each such ultra fine filament having a generally circular cross-section and being positioned within its associated monofilament so as to longitudinally extend therewithin, one other of such resins being present within such monofilament in the form of a continuous matrix about said ultra fine filaments, the improvement which comprises the steps of:
    (a) cutting such monofilaments into lengths generally not greater than about one-half inch,
    (b) effecting substantial separation of each resin from the others in a fluid medium, said fluid medium being so chosen as to be at least a partial solvent for one of said resins,
    (c) forming a mat from the resulting separated resinous materials by paper-making techniques,
    (d) subjecting the resulting structure to a zone of heat sufficient to bond one type of resinous particles to other particles of the same type so as to produce a continuous skeletal structure composed of that type of resinous material, said zone of heat being insufficient to appreciably alter the physical characteristics of other types of resin present.

2. In a process for making a non-woven, moisture vapor permeable, flexible, mat-like structure from monofilaments composed of at least two incompatible thermoplastic resins, each such monofilament being characterized by having one of said resins present therewithin in the form of ultra fine filaments, each such ultra fine filament having a generally circular cross-section and being positioned within its associated monofilament so as to longitudinally extend therewithin, one other of such resins being present within such monofilament in the form of a continuous matrix about said ultra fine filaments, the improvement which comprises the steps of:
    (a) cutting such monofilaments into lengths generally not greater than about one-half inch,
    (b) dispersing the resulting cut monofilaments in a liquid medium, said liquid medium being so chosen as to be at least a partial solvent for one of said resins,
    (c) agitating the resulting dispersion until there results a substantial separation of each resin from the others,
    (d) forming a mat by paper-making techniques, and
    (e) subjecting the resulting structure to a zone of heat sufficient to bond one type of resinous particles to other particles of the same type so as to produce a continuous skeletal structure composed of that type of resinous material, said zone of heat being insufficient to appreciably alter the physical characteristics of other types of resin present.

3. In a process for making a non-woven, moisture vapor permeable, flexible, mat-like structure from monofilaments composed of at least two incompatible thermoplastic resins, each such monofilament being characterized by having one of said resins present therewithin in the form of ultra fine filaments, each such ultra fine filament having a generally circular cross-section and being positioned within its associated monofilament so as to longitudinally extend therewithin, one other of such resins being present within such monofilament in the form of a continuous matrix about said ultra fine filaments, the improvement which comprises the steps of:
    (a) cutting such monofilaments into lengths generally not greater than about one-half inch,
    (b) dispersing the resulting cut monofilaments in a liquid medium, said liquid medium being so chosen as to be at least a partial solvent for one of said resins,
    (c) agitating the resulting dispersion until there results a substantial separation of each resin from the others,
    (d) depositing the resulting dispersion upon a paper-making screen so as to produce a mat,
    (e) couching such mat to remove excess liquid,
    (f) drying such mat to remove residual liquid,
    (g) subjecting the resulting structure to a zone of heat sufficient to bond one type of resinous particles to other particles of the same type so as to produce a continuous skeletal structure composed of that type of resinous material, said zone of heat being insufficient to appreciably alter the physical characteristics of other types of resin present.

References Cited

UNITED STATES PATENTS

| | | | |
|---|---|---|---|
| 2,784,135 | 3/1957 | Wooding | 162—157 X |
| 3,049,466 | 8/1962 | Erlich | 162—157 X |
| 3,097,991 | 7/1963 | Miller | 162—157 |
| 3,099,067 | 7/1963 | Merriam | 161—172 X |
| 3,271,237 | 9/1966 | Sommer | 162—157 X |

HOWARD R. CAINE, *Primary Examiner.*

U.S. Cl. X.R.
162—146; 161—172